United States Patent [19]

Mills

[11] 4,034,486
[45] July 12, 1977

[54] MATHEMATICAL BEADS

[76] Inventor: Rasjad Mills, 2101 "R" St., NW., Washington, D.C. 20008

[21] Appl. No.: 619,373

[22] Filed: Oct. 3, 1975

[51] Int. Cl.² .......................................... G09B 19/02
[52] U.S. Cl. ........................................ 35/30; 35/31 C
[58] Field of Search ........ 35/18 A, 30, 31 R, 31 A, 35/32, 33, 70; 273/152.7 R

[56] References Cited

U.S. PATENT DOCUMENTS

| 378,866 | 3/1888 | Clark | 35/33 |
| 1,161,381 | 11/1915 | Duffy | 35/30 X |
| 1,187,353 | 6/1916 | McBride | 35/32 X |
| 2,481,058 | 9/1949 | Zarlengo | 35/31 R |
| 2,513,596 | 7/1950 | Severson et al. | 35/70 |
| 2,708,797 | 5/1955 | Hamer | 35/33 |
| 2,782,039 | 2/1957 | Martin | 35/70 X |
| 3,423,093 | 1/1969 | Lahav | 35/18 A X |
| 3,523,377 | 8/1970 | Gardner | 35/31 G |
| 3,628,261 | 12/1971 | Thompson | 35/70 |

FOREIGN PATENT DOCUMENTS

| 489,074 | 5/1970 | Switzerland | 35/31 G |

Primary Examiner—Richard J. Apley

[57] ABSTRACT

In a preferred embodiment of the invention, a string of beads are characterized by a variety of different colors of which at least some beads thereof are of identical colors when indicia thereon are compared and matched, and consecutive beads serially extending between the matched beads are also matched, a centrally located bead of the series of beads in between remaining as an odd unmatched bead contains an indicia which is a mathematical answer of the relationship between the matched compared beads, such as the answer being a sum or a quotient or a product or a square, or the like.

5 Claims, 4 Drawing Figures

MATHEMATICAL BEADS

This invention relates to question and answer beads in interconnected series, as an educational toy.

BACKGROUND TO THE INVENTION

Prior to the present invention, there has existed a need for gadgets of the type which will readily interest children which might be of some measurable value as a teaching aid, particularly for small children of kindergarten and/or prekindergarten ages. Unfortunately, many suggested and/or available aids are either extremely limited in the amount of teaching that can be achieved by use thereof, and thus expensive relative to the teaching value thereof, or otherwise are so complicated as to be above the understanding or interest level of the children for which it is designed.

SUMMARY OF THE INVENTION

Accordingly, objects of the present invention include the overcoming and/or avoiding of problems faced heretofore, together with obtaining advantages and meeting at least some of the prior needs not heretofore fulfilled.

Another object is to obtain a novel teaching aid in the form of a toy device which is utilizable as a mathematical teaching aid.

Another object is to obtain a novel string of beads of differing colors and carrying indicia in relation to colors and mathematical relationships with answers being easily discernible by comparisons thereof.

Another object is to obtain bead necklaces and/or chains by which mathematical addition, subtraction, division, multiplication, squaring, logarithms and the like may be taught.

Other objects become apparent from the preceding and following relationship.

One or more objects are obtained by the invention as defined herein.

Broadly the invention may be defined as an educational toy in the nature of interconnected objects which in loose terminology may be termed beads, but having no required particular shape necessarily, preferably in the nature however of conventional beads in a string or branched string or necklace or the like, the bead aspect being important only in the inherent appeal of such to small children around the age of prekindergarten or kindergarten children whose span of attention is normally short, but with toy beads is more easily retained; the educational aspect arises from a predetermined order of the beads interconnected by any desired or conventional means, a predetermined number of the beads as arranged in the predetermined order, carrying indicia bearing a discernible relationship to one-another to an extent that at least one bead of an interrelated group provides a answer to another one or more beads of that particular interrelated group.

The theme, therefore, is a question and answer theme, in which the answer may be readily located by virtue of the child learning what the predetermined physical arrangement of the beads is, such that having located the question bead(s) the child may locate easily the answer. There is no limit as to the nature of the educational subject matter.

In a preferred embodiment, however, the beads are directed to some one or more mathematical relationship, preferably a single string of beads being limited to one type of mathematical relationship such as addition, subtraction, division, multiplication, logarithms, the squaring of a number, square root, or the like. Obviously, for small children the mathamatical subject matter would be limited to simple mathamatics such as the adding, subtraction, multiplication, division and the like, with the higher mathamatics being utilized for older ages including even college ages.

In order for the person to ascertain the question and answer relationship, for any particular interrelated group of beads dealing with a particular question and answer the question beads — such as numbers to be added, would be matched in a pair and then thereafter all intermediate beads extending therebetween would be matched also in pairs — starting with the beads adjacent the first-matched pair until a single odd unmatched bead remains which unmatched bead bear indicia which is the answer, namely the sum of the numbers being added by the initial matching as a pair.

Another example of a predetermined order, which may be in conjunction with the above-noted arrangement or optionally separate, is where beads to be matched carry a predetermined physical characteristic such as common size or common coloration or common shape, or the like, or one or more of these, and thereafter the intermediate beads are examined to find the odd middle bead therebetween which bead carries the answer, as described above.

If the beads are arranged in a linear string, a lower bead would be matched with a higher bead, or the higher matched with a lower, as the case may be, and the odd intermediate bead thereafter located. In like manner, if a necklace, merely one bead along the way, as noted above, having the same color, for example, is matched with another having the same color — where both carry an indicia such as 5 and 3, and thereafter for beads therebetween the middle odd bead with the answer is located, namely answer 8.

Accordingly, it is not really material whether or not the beads are arranged in a linear or necklace or branched relationship, since the mechanism for locating the answer may be the same for any arrangement. Thus, for example, for a single linear arrangement, the beads of the single string may be the answer beads, while branching in each of opposite directions therefrom are one of more beads at least one of each branch being a question bead which when matched with the question bead of the other branch results in the central odd bead answer indicia carried by that odd bead which is the bead of the main string.

The invention may be better understood by making reference to the following Figures.

THE FIGURES

FIG. 1 illustrates diagrammatically a necklace string of educational beads of the present invention in which beads to be matched are the bead carrying a 2 and one carrying a 3, to discover the odd bead carrying the sum thereof namely the 5, in a side view thereof.

FIG. 2 illustrates a different arrangement in an in-part view, in which the squaring of numbers is illustrated to get the answer of the intermediate central or odd bead therebetween carrying the answer, namely 16 for 4 squared, or 25 for 5 squared, for example, shown in a side view.

DETAILED DESCRIPTION OF THE INVENTION

Figure 1:
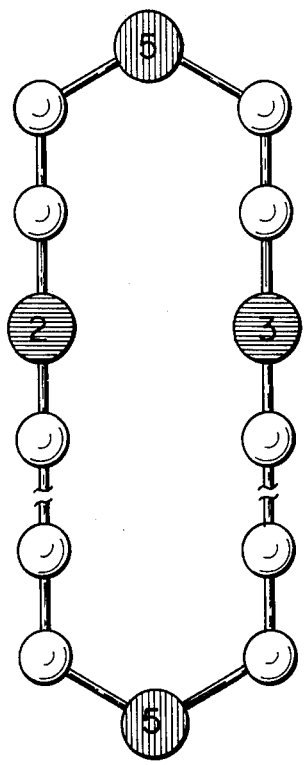

In greater detail, interrelated relationships may be indicated by common color or common shape or common size, or the like, any one or more of these. Accordingly, the necklace of FIG. 1 illustrating the matching of beads to determine the sum answer, includes common colors of the bead carrying the indicia 2 with the bead carrying the indicia 3, to thereafter locate the middle odd bead therebetween — at either end of the necklace in this example — namely either bead carrying the indicia 5, the sum of 3 and 2.

Figure 2:
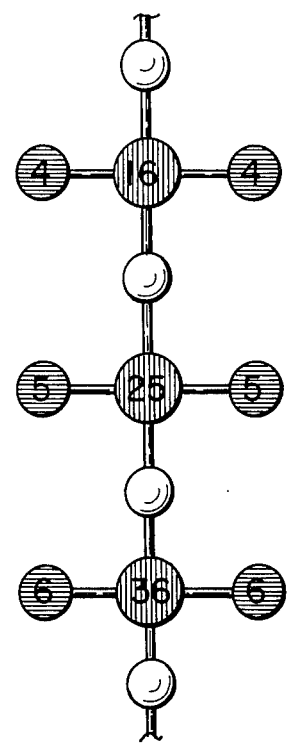

In like manner, the branched beads of FIG. 2 have the beads of the opposite branches to be matched a common color, which give the intermediate bead answer of the bead of the linear string, namely the answer to the square of the question beads — as 4 when squared is the same as 4 times 4, to give the answer; in this instance, other arrangements may introduce a square sign if desired, whereby only one of the matched beads would carry the numeral to be squared, this not being illustrated however.

Figure 3:
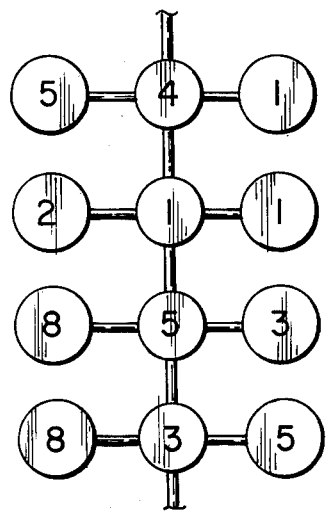
FIG. 3 illustrates a similar type arrangement as FIG. 2, but with different indicia, as a subtraction string, in side in-part view.

The FIG. 3 arrangement illustrates a branched bead string in which large beads of opposite branches may be compared, for the subtraction of a smaller number from a larger number to get the answer, beads being compared being large while the answer intermediate bead is small. For example the beads illustrate bead 5 minus a bead carrying indicia 1, the intermediate bead indicia answer being 4. Next illustrated, is indicia 2 minus indicia 1, to get the middle bead indicia 1. Next is the bead 8 indicia minus the bead carrying indicia 3 to get the answer 5.

Figure 4:
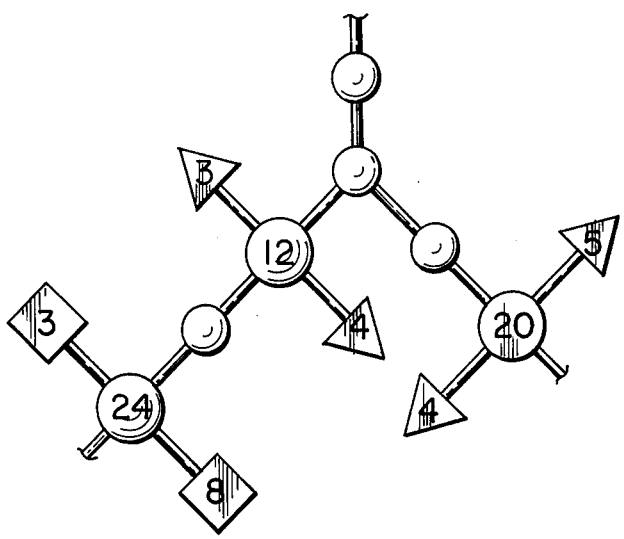
FIG. 4 illustrates a branched chain, in side in-part view, in this case for multiplication — as 3 bead indicia multiplied by 4 bead indicia equals the intermediate odd middle bead indicia 12, for example.

FIG. 4 illustrates a further branching type arrangement, in which for multiplying, common shapes of opposite banches are compared, as bead of indicia 3 being compared with the bead of indicia 4 in one instance — having common shapes as a triangle, to get the answer 12 of the odd intermediate round bead. In another instance, square bead of indicia 3 is matched with square bead of indicia 8, to obtain answer 24 of the round intermediate bead.

It is within the scope of the invention to make such variations and substitution of equivalents as obvious to a person of ordinary skill.

I claim:

1. Educational toy beads device comprising in combination: a plurality of beads permanently interconnected in a predetermined series including an answer bead located by bead total count of the series, equidistantly intermediate between other total beads of the series of which the other beads at least two question beads are spaced on opposite sides of the answer bead equidistantly from the answer bead, carrying on the question beads respectively predetermined numerical indicia which considered jointly bear a mathematical relationship which equals a mathematical answer-indicia carried on the answer bead.

2. The educational toy beads device of claim 1, in which said predetermined other beads have numerical indicia which when added equal said answer-indicia of said answer bead.

3. The educational toy beads device of claim 1, in which said predetermined other beads have numerical indicia which when a smaller numerical indicia of one thereof is subtracted from a larger numerical indicia of the remaining one thereof equals a methematical remander numerical indicia of said answer bead.

4. The educational toy beads device of claim 1, in which said predetermined other beads have numerical indicia which when multiplied times each other equals a mathematical product numerical indicia of said answer bead.

5. The educational toy beads device of claim 4, in which indicia of each of said predetermined other beads are identical.

* * * * *